United States Patent [19]

Benjes et al.

[11] 4,311,593
[45] Jan. 19, 1982

[54] PROCESS FOR TREATMENT OF WASTE WATER

[75] Inventors: Henry H. Benjes, Overland Park; Valery N. Wahbeh, Leawood; John R. Stukenberg, Overland Park, all of Kans.

[73] Assignee: Bacardi Corporation, San Juan, P.R.

[21] Appl. No.: 187,551

[22] Filed: Sep. 15, 1980

[51] Int. Cl.³ .............................................. C02F 3/28
[52] U.S. Cl. ................................ 210/603; 210/610; 210/613; 210/615; 435/167
[58] Field of Search .............. 210/601, 608, 603, 610, 210/613, 615–618, 630, 631, 150, 151, 180, 195.3; 435/167

[56] References Cited

U.S. PATENT DOCUMENTS

| | | | |
|---|---|---|---|
| 2,308,866 | 1/1943 | Dekema | 210/151 |
| 2,364,298 | 12/1944 | Kamp | 210/150 |
| 2,516,076 | 7/1950 | Schlenz | 210/613 |
| 2,640,027 | 5/1953 | McNamee | 210/603 |
| 2,881,137 | 4/1959 | Logan | 210/603 |
| 3,112,261 | 11/1963 | Porter | 210/150 |
| 3,259,566 | 7/1966 | Torpey | 210/603 |
| 3,275,147 | 9/1966 | Gilde | 210/150 |
| 3,338,826 | 8/1967 | Kramer | 210/613 |
| 3,402,103 | 9/1968 | Amberg | 210/615 |
| 3,711,392 | 1/1973 | Metzger | 210/603 |
| 3,829,377 | 8/1974 | Hashimoto | 210/617 |
| 3,838,199 | 9/1974 | Coe | 210/603 |
| 3,981,803 | 9/1976 | Coulthard | 435/167 |
| 4,040,953 | 8/1977 | Ort | 210/603 |
| 4,092,338 | 5/1978 | Tossey | 210/603 |
| 4,211,647 | 7/1980 | Friedman | 210/150 |

FOREIGN PATENT DOCUMENTS

| | | | |
|---|---|---|---|
| 2905371 | 8/1979 | Fed. Rep. of Germany | 210/150 |
| 2337576 | 11/1971 | France | 210/615 |

OTHER PUBLICATIONS

Infilco Bulletin 6200, 325 W. 25th Place, Chicago 16, Illinois.

Primary Examiner—Ernest G. Therkorn
Attorney, Agent, or Firm—Fishburn, Gold and Litman

[57] ABSTRACT

A method is provided for reducing the oxygen demand of waste water having a partial organic composition, especially a solution commonly known as mostos which is the waste effluent of a molasses fermentation and distillation process. The waste water is fed into an anaerobic digester near the top thereof so as to flow downwardly through the interior of the digester. The digester is at least partially filled with a high surface area media. The digester contains a microorganism which preferentially produces methane when in contact with the organic material in the waste water and also reduces the oxygen demand of materials therein. Also preferentially, the microorganisms tend to grow on the media surface. Nitrogen and phosphorous containing materials are added as necessary to promote growth of the microorganisms. As the waste water flows downwardly through the digester, methane is released therefrom which bubbles to the surface whereupon the methane is collected for combusting to produce energy. A buffering component may be added to the digester so as to produce an optimum pH for the process. Preferred temperatures of the digesting process are 95° F. and the range of 125° to 130° F. During the process a portion of the biomass of the microorganisms growing on the media surface is sloughed therefrom and settles to the floor of the digester. The sloughed biomass along with a portion of the waste water is recirculated from the bottom of the digester to the top thereof, preferably at a rate of five times the flow of the influent to the digester. An effluent flow is removed from the digester in such a manner as to overflow the top thereof without allowing atmospheric air therein. When necessary to aid in removing biomass from the filter media, the collected methane may be selectively recirculated into the bottom of the digester and bubbled up through the waste water therein. A pressure of approximately one pound per square inch is preferably maintained on the digester to urge carbon dioxide produced during the process to remain in solution with the effluent.

8 Claims, 6 Drawing Figures

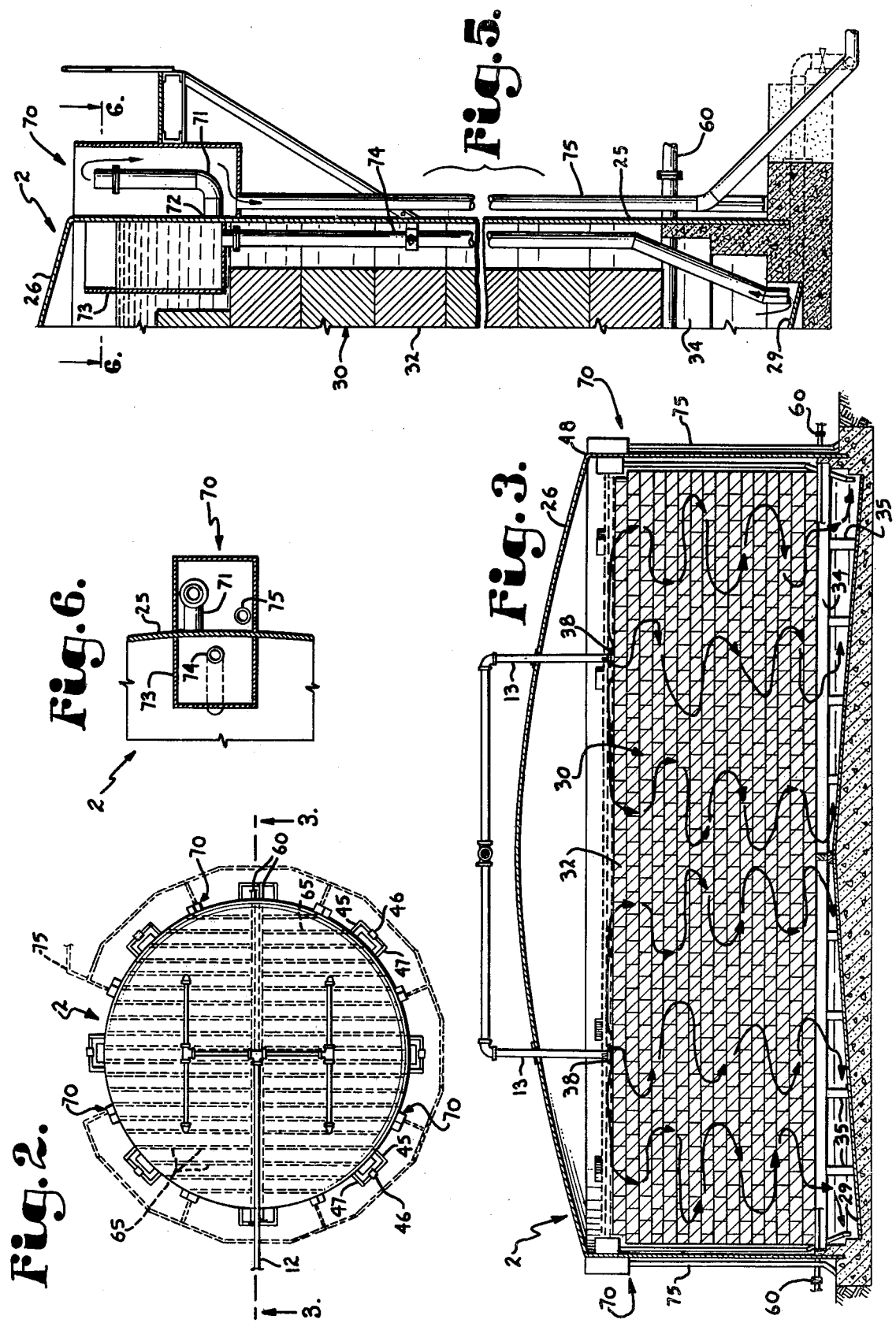

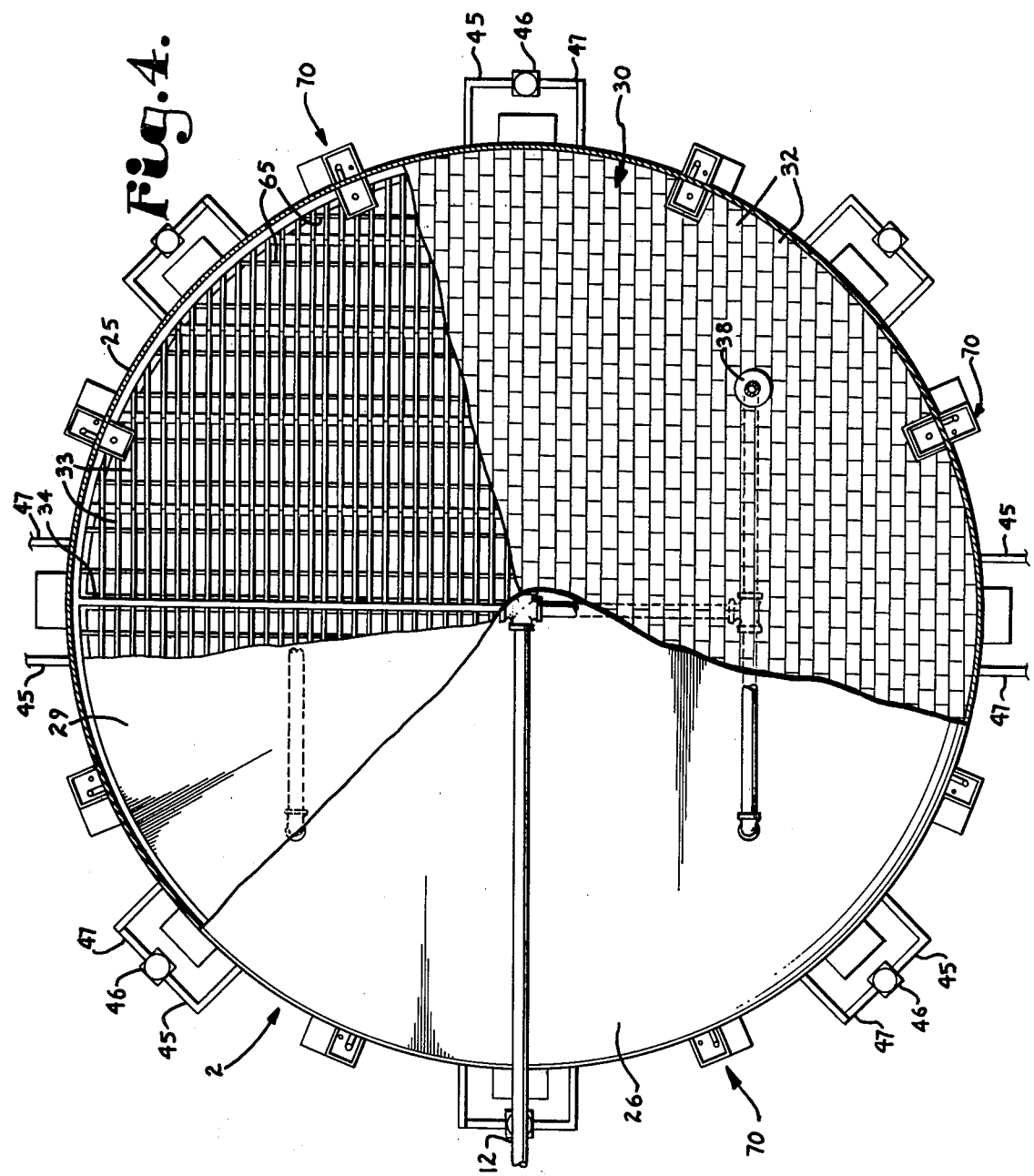

PROCESS FOR TREATMENT OF WASTE WATER

CROSS-REFERENCE TO RELATED APPLICATIONS

The present application is directed to a process which is related to a copending application entitled APPARATUS FOR TREATMENT OF WASTE WATER, filed contemporaneously with the present application.

BACKGROUND OF THE INVENTION

The present invention relates to treatment of waste water or sewage so as to remove impurities therefrom, in particular to the removal of oxygen demanding impurities and the production of methane therefrom.

Historically there have been a great number of devices and processes for removing impurities from the waste water so as to improve the quality thereof. Such devices have included clarifiers and digesters, and such processes have included both aerobic and anaerobic processes, examples of which are commonly referred to as filter and contact processes. In a typical filter process the waste water is directed upwardly through a filter vessel with microorganisms therein and is thereafter passed through a degasifier and into a settling basin. An underflow from the settling basin is then returned to the filter vessel. In the contact process waste water is injected into a vessel and agitated in contact with sludge containing microorganisms. Effluent leaving the contact vessel is passed through a degasifier and into a settling tank. Heavier sludge falls to the bottom of the settling tank and is recirculated to the contact vessel.

There are a large number of industries which, because of the nature of the product thereof, produce a waste water solution which is very high in organic constituents and is generally unacceptable for disposition in a lake, a river or the like because of the high oxygen demand associated therewith. In particular, environmental laws and regulations are becoming increasingly stringent in requiring the removal of chemical and biological oxygen demanding substances (COD and BOD) from waste water before such water is allowed to flow into public waterways. An example of such a waste water is the effluent from processes wherein molasses or the like is fermented and distilled in the production of alcoholic beverages or ethanol for the use in gasohol, such waste being commonly referred to as slops or mostos. The mostos, which is substantially underflow produced in the distillation process, typically has certain elements such as yeast already removed therefrom, however, same will typically have a very high oxygen demand.

While a number of the prior art processes are in various degrees successful in removing a portion of the oxygen demand from waste water, such as mostos, such processes typically require a degasifier and settler along with an anaerobic vessel with resultant complexities and problems associated with multiple pieces of equipment. Also, prior art processes frequently require both anaerobic and aerobic stages. In many of the prior art processes the methane normally produced during the reduction of oxygen demanding components is lost to the atmosphere.

It has been found that by the addition of certain features to an anaerobic digester, that the ancillary equipment such as degasifiers and clarifiers can be substantially eliminated while increasing the load passing therethrough with substantially equivalent reduction in oxygen demanding components as compared to prior art devices and methods.

OBJECTS OF THE INVENTION

Therefore the objects of the present invention are: to provide a method for treating waste water containing organic material and having an oxygen demand so as to reduce such demand; to provide such a method wherein the waste water is treated in an anaerobic vessel or digester having a media therein providing a high surface area; to provide such a method wherein the waste water is directed downwardly through the media; to provide such a method wherein the organic material in the waste water is acted upon by a microorganism biomass normally at least partially attached to the media; to provide such a method wherein the waste water along with a portion of the biomass which has fallen from the media is recirculated from the bottom of the digester to the top thereof; to provide such a method wherein nutrients are added for the microorganisms along with buffering of the pH of the waste water so as to maximize activity of the microorganism; to provide such a method wherein methane is produced by the microorganisms and is captured for later use as a combustible; to provide such a method wherein the methane may be recirculated and bubbled up through the media so as to agitate the biomass in the digester; to provide such a method wherein the temperature in the digester is maintained at approximately preferred temperatures of 95° F. or the range of 125° to 130° F.; to provide such a method wherein a pressure slightly greater than atmospheric is maintained within the digester, preferably approximately one pound per square inch, so as to urge carbon dioxide produced in the digester to remain in solution and to flow therefrom in an effluent stream; and to provide such a process which is economical and efficient in use and which is particularly well adapted for the proposed usage thereof.

Other objects and advantages of this invention will become apparent from the following description taken in connection with the accompanying drawings wherein are set forth by way of illustration and example, certain embodiments of this invention.

SUMMARY OF THE INVENTION

A method is provided for reducing the oxygen demand of waste water, especially effluent from a fermentation and distilling process having a partial organic composition, commonly known as mostos. The waste water is fed into an anaerobic digester near the top thereof so as to flow downwardly through the interior of the digester. The digester is at least partially filled with a high surface area media. The digester contains a microorganism which preferentially produces methane when in contact with contaminant material in the waste water and reduces the oxygen demand of such material. Also preferentially, the microorganisms tend to propagate on the media surface and engage the waste water flowing therethrough. Nitrogen and phosphorous containing materials and/or other nutrients are added as necessary to promote growth of the microorganisms. As the waste water flows downwardly through the digester, methane is released therefrom which bubbles to the surface whereupon the methane is collected for combusting to produce energy. The methane bubbles tend to scour and agitate microorganism biomass on the media. A buffering component may be added to the digester or influent waste water so as to produce an optimum pH for the process. Preferred temperatures of the digesting process are 95° F. and the range of 125° to 130° F. During the process a portion of the microorganism biomass growing on the media surface is sloughed therefrom and settles to the floor of the digester. The sloughed biomass along with a portion of the waste water is recirculated from the bottom of the digester to the top thereof, preferably at a rate of five times the flow of the influent to the digester. An effluent flow is removed from the digester through a stand pipe with an associated trap to prevent atmospheric air from entering the digester and methane from escaping into the atmosphere. Additional treatment may be later applied to effluent if desired. Where necessary to remove biomass from the filter media and to agitate the biomass so as to better mix with the waste water, the methane stream is selectively recirculated into the bottom of the digester and bubbled up through the media and the waste water therein. Preferably a pressure of approximately one pound per square inch is preferably maintained on the digester to urge carbon dioxide produced during the process to remain in solution with the effluent.

The drawings constitute a part of this specification and include exemplary embodiments of the present invention and illustrate various objects and features thereof.

BRIEF DESCRIPTION OF THE DRAWINGS

FIG. 2 is a top plan view of the digester including piping associated therewith.

FIG. 3 is a cross-sectional view of the digester taken along line 3—3 of FIG. 2.

FIG. 4 is a top plan view of the digester with portions broken away at various levels to show details thereof.

FIG. 5 is a fragmentary and enlarged vertical cross-sectional view of the digester showing a side thereof with an associated overflow.

FIG. 6 is a fragmentary horizontal cross-sectional view of the digester showing the overflow as seen in FIG. 5.

DETAILED DESCRIPTION OF THE PREFERRED EMBODIMENT

Figure 1:
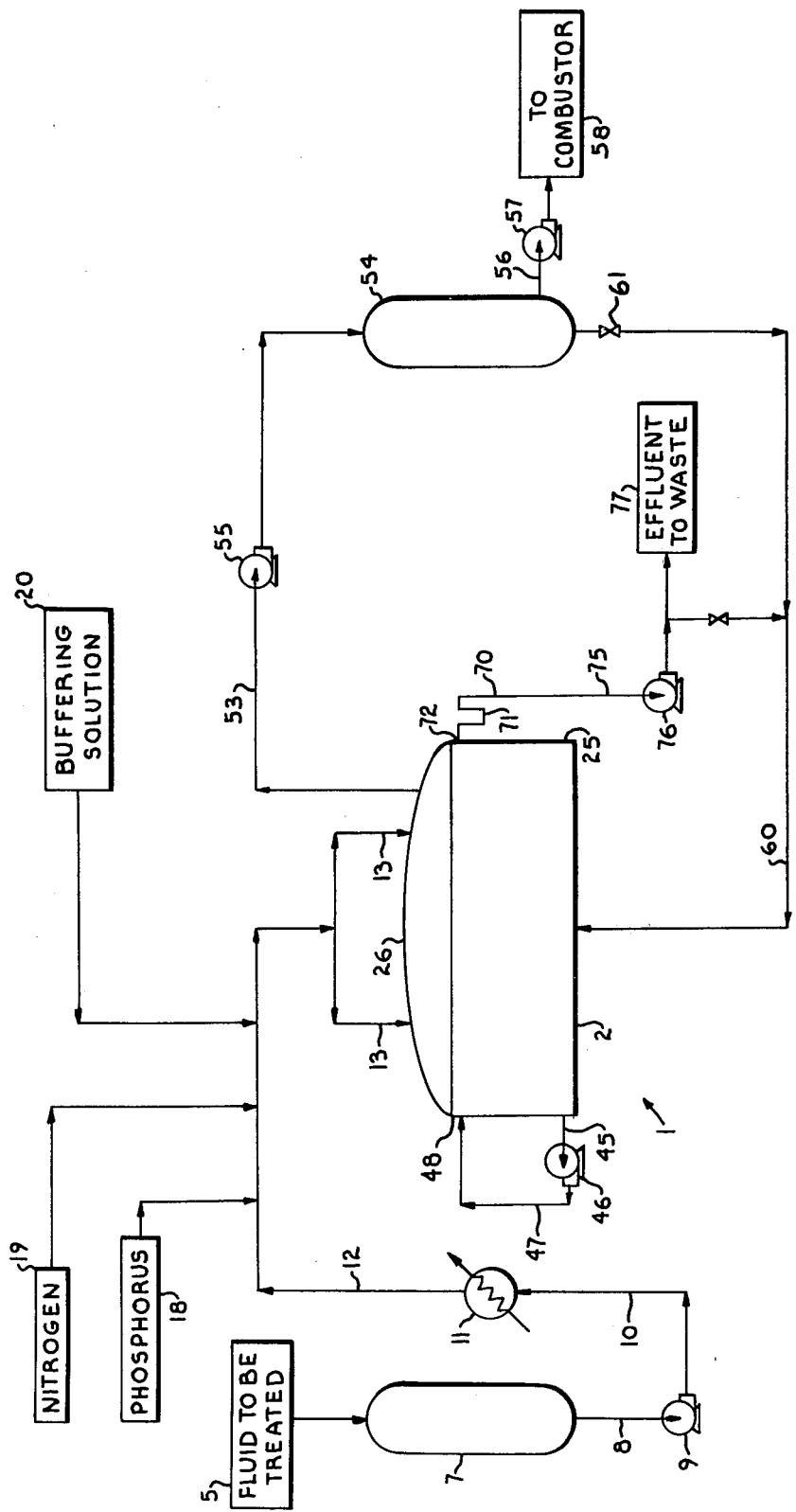
FIG. 1 is a schematic diagram of an apparatus performing the process of the present invention including a digester.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

An apparatus for treatment of waste water according to the present invention is schematically illustrated in FIG. 1 and is generally referred to by the numeral 1. The apparatus 1 comprises an anaerobic digester 2.

The box 5 generally designates fluid to be treated by the apparatus 1 which may be any waste water solution or the like having organic and/or other contaminants suitable for being acted upon by microorganisms to reduce the amount of organic contamination, especially elements creating an oxygen demand therein. In particular, in the presently described embodiment this fluid is a waste stream of a molasses fermentation and distillation process comprising the non-distilled portion of the fermented molasses, especially carbohydrate residue, less the yeast contained therein. This fluid may also contain other materials such as barrel washing and the like and is generally relatively high in organic substances having a biological and chemical oxygen demand (BOD and COD). The fluid exits the fermentation process at a temperature in the nature of 200° F. and enters a holding tank 7. The holding tank 7 is preferably insulated and equipped with agitators (not shown). The fluid from the holding tank 7 is selectively allowed to flow through a conduit 8 and into a pump 9 which is generally a constant volume per unit time pump and thereafter through a conduit 10 under pressure from the pump 9. The fluid then passes through a heat exchanger 11 which may be selectively cooled by a flow stream of fermentated molasses prior to distillation thereof or by cooling water from a conventional cooling tower or the like. The fluid may also be selectively heated by the heat exchanger 11. The fluid then passes through the conduit 12 into the digester 2. As better seen in FIG. 2, the conduit 12 diverges into four distribution conduits 13 which enter the digester 2 at somewhat symmetrically spaced locations.

The box 18 generally represents input of phosphorous in a usable form for growth development of microorganisms of the anaerobic methane producing or chemically reducing type. A suitable phosphorous form would be diammonium phosphate as fed to the process by a conventional system well-known in the art. The box 19 generally represents input of nitrogen into the fluid stream which nitrogen is also useful for the growth and development of microorganisms of the type used in the digester 2. A suitable source for the nitrogen may be anhydrous ammonia as provided by a conventional ammonia handling system or alternatively, by use of the ammonium phosphate or the like. It is noted that some fluids may contain a suitable source of phosphorous and nitrogen and thus supplementation thereof will not be necessary.

Preferably a buffering solution is added to the fluid before entry thereof into the digester so that the pH of the fluid entering the digester is in the range of approximately 5 to 9 and preferably between 6.5 and 7.0. As the pH of mostos is approximately 4.5, a basic buffering solution is normally added thereto and is represented by the box 20. The buffering solution should be able to bring the pH of the fluid to the preferred range and maintain same in that range while the fluid is being acted upon by microorganisms in the digester. In particular, bacteria and other microorganisms present in digesters typically first convert the organic material in the fluid stream to an organic acid which, if there is no buffering solution present, will substantially lower the pH of the fluid in the digester. A suitable buffering solution would be caustic soda (sodium hydroxide) or lime, although numerous similar substances may be utilized providing same are compatible with growth microorganisms in the digester 2. Although not shown, where HS ion toxicity in the digester 2 is a problem ferric chloride or the like may also added with the buffering solution.

The digester 2 is generally a large cylindrical vessel 25 having a free standing dome 26 which is substantially air-tight to prevent air from entering the digester 2 and destroying the anaerobic or oxygen-free state therein and to prevent escape of methane to the atmosphere. In the illustrated embodiment, as seen in FIG. 3, a floor 29 of the digester 2 is raised at the center thereof and slopes gradually downwardly toward the outer wall thereof. The interior of the vessel preferably contains a latice, matrix or other suitable media having a substantial surface area thereon. Media 30 should be suitable for retaining and allowing growth of at least a portion of the microorganisms thereon, such as conventional packing. However, it is important that the flow of the fluid through the digester be somewhat tortuous so as to encourage the fluid to engage and mix with the microorganisms, yet not be impeded. In particular, the path and size of the openings in the media should be of sufficient porosity to allow microorganism biomass which is sloughed from the media 30 to fall or settle a lower portion of the digester 2 and not plug the flow pathway. Media 30 having openings therein of approximately one inch or slightly greater are considered sufficient. One alternative media 30 would be blocks or bundles 32 of PVC plastic such as sold under the trademarks Vinyl Core and Koro-Z, that is, corrugated polyvinyl chloride assembled into self supporting modules, as manufactured by the B. F. Goodrich Company. In the illustrated embodiment, the bundles 32 of the media 30 substantially fill more than the upper two thirds of the digester 2 up to near the dome 26. The bundles 32 are supported upon cross-members 33 and 34 which are in turn supported by upright stanchions 35 resting upon the floor 29 of the digester 2. There is a substantially open space between the media 30 and the floor 29 such that microorganism biomass sloughed from the media 30 can fall to the floor 29 and be urged outwardly toward the side wall of the digester 2 without interference from the media 30. The fluid entering the digester 2 is preferably evenly distributed by a plurality of radially spaced and horizontally directing nozzles 38 above the media 30.

Recirculation means herein comprising pumps and conduits recirculate fluid from near the floor 29 of the digester 2 to near the top of the media 30. In particular, in the illustrated embodiment, a plurality of radially spaced conduits 45 are positioned near the lower end of the side wall of the digester 2 and provide for flow of fluid including microorganism biomass or sludge therefrom to an associated pump 46. The pump 46 recirculates flow through the conduit 47 back into the digester 2 near the top 48 thereof. In the illustrated embodiment there are eight recirculation paths including the conduits 45, 47 and pumps 46. It is desirable to continually and directly recirculate fluid and the microorganism biomass associated therewith from the bottom of the digester 2 to the top thereof such that the biomass is more likely to engage and interact with the digester influent fluid. Such recirculation is also believed to reduce the amount of acidity normally formed near the location where the influent enters the digester 2, as the methane forming bacteria in the biomass can act more quickly. Although the optimum recirculation rate varies substantially between types of fluids and various conditions in the digester 2, a suitable recirculation rate for the presently described process is found to be approximately five times the flow rate of the influent fluid to the digester 2.

The microorganism utilized in the process may be any microorganism which will convert organic material to methane under anaerobic conditions and the other conditions present within the digester 2. A suitable culture of such microorganisms may be obtained by removing a seed or starter culture from a conventional digester or simply by including a sample of fresh cow manure in the digester during start-up period.

Methane produced within the digester 2 bubbles to the surface of the fluid therein and is collected within the dome 26 and is conducted therefrom by conduit 53 to a holding tank 54 via compressor or pump 55. The methane is normally taken from the holding tank 54 through conduit 56 and pressurized by pump 57 after passage through a desulfizer when necessary. Such methane is delivered to a combustor represented by the box 58 which may be a boiler for producing steam or a heater for distilling the fermented molasses. It may also be desirable at times to urge a portion of the microorganism biomass from the media 30 as the biomass grows sufficiently large to occlude the passageways through the media 30 or to agitate the biomass within the digester 2. When such occlusion occurs, or when additional scouring of the media 30 is desired, the methane in the holding tank 54 may be selectively routed by operation of valve 61 through conduit 60 under pressure so as to recirculate and enter a lower portion of the digester 2 and be sparged therein by nozzles or apertures along distribution lines 65. The sparged methane tends to loosen, stir and agitate the biomass and urge same to mix or interact with fluid in the digester 2 when the normal rise of methane gas through the media 30 is not sufficient to do so, especially in the vicinity of the digester floor 29.

Although there is a wide range of temperatures within which methane producing microorganisms will function and any of these temperatures are suitable for operation of the present invention, it has been found in the present process that there are two preferred temperature states. The first such temperature state is normally referred to as the mesophillic range around 95° F. and the other is the thermaphillic range between approximately 125° to 130° F. Normally the latter range will provide faster methane production and will be used herein since the waste water treated will already be relatively warm.

The digester 2 is also provided with an effluent outflow device 70. The device 70 includes a liquid trap 71 attached to an upper end 72 of the fluid containing portion of the digester 2. Interior of the wall of the digester 2 and communicating with the trap 71 is an open top collection box 73 which in turn communicates with a downcomer conduit 74. While the effluent may be withdrawn from anywhere along the vessel side 25, the inlet to the conduit 74 thus being the normal location of exit of the effluent from the digester 2, is near the digester bottom 29 and near wall 25. The trap 71 overflows into a conduit 75 and thereafter is transferred by a pump 76 or gravity. In the illustrated embodiment the effluent is wasted to a sewer or the like as represented by box 78.

Thus, in the present embodiment fluid flows into the digester 2 near the top thereof, flows downwardly through the media 30, is recirculated by the recirculating means directly from near the bottom of the digester 2 to near the top thereof at a rate substantially greater than the influent rate, and is removed from the digester 2 after treatment by the microorganisms to reduce oxygen demand in the effluent and to produce methane.

Preferably, a slight pressure is maintained within the digester 2. This slight pressure urges carbon dioxide which is also produced by the methane producing microorganisms to remain in solution in the fluid within the digester 2. Thus, the carbon dioxide tends to leave the digester in the effluent stream rather than in the methane stream. Too great a pressure within the digester 2 is normally avoided due to problems of maintaining seals about the effluent traps 71 but may be utilized when necessary to further reduce carbon dioxide in the methane. A suitable pressure has been found to be in the nature of one pound per square inch which is estimated to provide a gas mixture to the holding tank 54 in the nature of approximately 60 to 70 percent methane with substantially the remainder being carbon dioxide. A wider range of pressures may be utilized and it is foreseen that the pressure could even be a slight vacuum within the digester 2.

In use the method of utilizing the apparatus 1 comprises distributing the influent fluid to be treated near the top of the digester 2, flowing the fluid downwardly through the media 30 so as to contact microorganisms attached to and in the vicinity of such media, recirculating a portion of the fluid from a lower portion of the digester 2 beneath the media 30 directly to an upper portion of the digester 2 near the location of the distribution of the influent therein, and removing an effluent portion of the fluid from the digester 2 such effluent having been substantially treated by the microorganisms so as to remove methane therefrom and to reduce the biological oxygen demand thereof.

Preferably, the effluent into the digester 2 is buffered so as to maintain a pH in the nature of 6.5 to 7 with the effluent of the digester desired to be within the range of pH of 6 to 9. Nutrients are added to the influent to optimize growth of the bacteria in the digester 2. Also preferably the digester is maintained at a temperature of optimum growth and therefore activity by the microorganisms. Although such temperature varies somewhat, a suitable temperature has been found to be 95° or alternatively within the range of 125° to 130° F. The pressure of the digester is also maintained to optimize retention of carbon dioxide within the effluent from the digester 2, while still allowing function of the effluent trap 71. Gas from the methane holding tank 54 is diverted to the bottom of the digester 2 and bubbled up therethrough, when it is desired to remove additional biomass from the media 30 or to agitate the biomass to improve interaction with the fluid in the digester 2.

It is foreseen that additional treatment may be provided for the effluent of the digester 2 to remove additional contaminants from the waste water. It is also foreseen that the effluent or another liquid could be recycled under high pressure to the bottom of the digester to agitate the biomass and fluid therein instead of the methane.

The following examples are included for purpose of illustration only and are not intended to be limiting with reference to the present invention.

EXAMPLE

The following is a calculated example of the effects of the process disclosed in the preferred embodiment:

Influent flow rate of mostos to digester in gallons per day—340,000
BOD in grams per liter—47
COD in grams per liter—92
Pressure in digester in pounds per square inch—1
pH of mostos before process—4.5
pH of mostos after addition of NaOH—7.0
Temperature in digester (°Fahrenheit)—128
Height of digester in feet at side—40
Diameter of digester in feet—120
Loading of BOD on media in pounds of BOD per 1000 feet cubed of media—400
Dibasic Ammonium Phosphate addition in pounds per day—437
Recirculation rate with respect to flow of influent—5
Loading of fluid at top of media (influent plus recirculation) in gallons per minute per square foot—0.13
Methane production in feet cubed—1,000,000
COD in effluent in grams per liter—32
BOD in effluent in grams per liter—14.1
Biological solids in effluent in pounds per day—16,000

EXAMPLE II

A tank holding 2,300 gallons of fluid when substantially filled with media is maintained at 98° and a pH in the range of 5 to 8, preferably 6.5 to 7.5. Mostos is added at a rate in the range of 115 to 460 gallons per day after neutralization by lime, sodium carbonate, sodium bicarbonate and/or sodium hydroxide. Nutrients containing nitrogen and phosphorous from a suitable source are added at a ratio of 100 parts organic carbon to 5 parts nitrogen to 1 part phosphorous. Recirculation is in a range from 1 to 10 times the rate of addition of mostos to the tank. Influent BOD is 25,000 to 45,000 parts per million (ppm) and COD is 70,000 to 110,000 ppm. Retention time varies in the range of 5 to 20 days, preferably 7 days. It is calculated that BOD removal is 60 to 95 percent, COD removal is 60 to 90 percent, and methane gas generation is 4 to 10 cubic feet per pound of COD removed.

EXAMPLE III

The same conditions and results as in Example II except temperature is maintained in the range of 120° to 130° F. and retention time is generally from 2 to 20 days, preferably about 5 days.

It is to be understood that while certain embodiments of the present invention have been described and shown herein, it is not to be limited to specific forms or arrangement of parts herein described and shown.

What is claimed and desired to be secured by Letters Patent is as follows:

1. A process for reducing oxygen demanding material in a fluid in an influent stream of waste water and producing methane; said process comprising the steps of:
   (a) distributing said fluid within an upper portion of an anaerobic digester containing methane producing microorganisms in a high surface area media;
   (b) flowing said distributed fluid downwardly through said media to a lower portion of said digester;
   (c) generally continuously recirculating a substantial portion of said downwardly flowing stream after passing through said media from said lower portion of said digester directly to said upper portion of said digester such that from approximately one to ten times the amount of the influent stream is recirculated from said lower portion to said upper portion of said digester;
   (d) withdrawing an effluent stream of a portion of the fluid from within said digester after said effluent stream has been substantially acted upon by said microorganisms so as to reduce the oxygen demanding material therein with respect to said influent stream and so as to produce methane within said digester; and (e) removing a portion of the methane produced in said digester therefrom.

2. The method according to claim 1 wherein:

(a) said recirculation is such that approximately five times the amount of the influent stream is recirculated.

3. The method according to claim 1 including the step of:

(a) returning a portion of said methane to said lower portion of said digester and allowing said methane to bubble upwardly through said digester so as to pass through said media.

4. The process according to claim 1 including the steps of:

(a) adding nutrients to said influent so as to maximize growth of said microorganisms;

(b) maintaining the temperature within said digester between approximately 95° and 130° F.; and (c) buffering said influent to maintain a pH approximately within the range of 6.5 to 7 in said digester.

5. The process according to claim 4 wherein:

(a) said nutrients are biological suppliers of nitrogen and phosphorous; and (b) said temperature is within the range of 125° to 130° F.

6. The process according to claim 1 wherein:

(a) said effluent stream is substantially mostos from a molasses fermentation and distillation process.

7. The process according to claim 1 wherein:

(a) said methane is collected and combusted so as to provide usable energy.

8. In a process for treating an organic containing fluid with a microorganism so as to produce methane; said microorganism interreacting with said fluid in a vessel containing a high surface area media therein such that said microorganism grows upon said media in a biomass; the improvement comprising the steps of:

(a) collecting said methane from an upper portion of said vessel; and (b) injecting said collected methane into a lower portion of said vessel beneath said media so as to bubble up through said media and agitate a portion of said biomass therein.

* * * * *